United States Patent
Stettner et al.

(12) 
(10) Patent No.: US 6,315,811 B1
(45) Date of Patent: Nov. 13, 2001

(54) METHOD FOR PRODUCING PLATINUM

(75) Inventors: Martin Stettner, Altenstadt; Matthias Grehl, Frankfurt; Horst Meyer, Altenstadt, all of (DE)

(73) Assignee: W. C. Heraeus GmbH & Co. KG, Hanau (DE)

( * ) Notice: Subject to any disclaimer, the term of this patent is extended or adjusted under 35 U.S.C. 154(b) by 0 days.

(21) Appl. No.: 09/595,311

(22) Filed: Jun. 16, 2000

(30) Foreign Application Priority Data

Jun. 18, 1999 (DE) .............................. 199 28 027

(51) Int. Cl.$^7$ .............................. C22B 3/42; C22B 11/00
(52) U.S. Cl. .............................. 75/741; 423/22; 205/543; 205/565
(58) Field of Search .............................. 75/741; 423/22; 205/543, 565

(56) References Cited

U.S. PATENT DOCUMENTS

| | | | |
|---|---|---|---|
| 2,726,414 | * 12/1955 | Appell | 423/22 |
| 4,900,520 | * 2/1990 | Behnam et al. | 423/22 |
| 5,393,388 | * 2/1995 | Herrmann et al. | 204/109 |

FOREIGN PATENT DOCUMENTS

| | | |
|---|---|---|
| 404 026 B2 | 7/1998 | (AT) . |
| 147 688 A | * 4/1981 | (DE) . |
| 253 435 A1 | 1/1988 | (DE) . |
| 299 876 A | * 5/1992 | (DE) . |
| 55-164040-A | * 12/1980 | (JP) . |

OTHER PUBLICATIONS

M. Jaskula, et al.: "Untersuchung zur Verbesserung des Platinmetallausbringens bei der industriellen Silberraffination", pp. 393–400, dated 1997 no month.

M. Gülbas: "Rückgewinnung von Wertstoffen und Abwasserbehandlung mit Ionenaustauschern und Adsorberharzen", pp. 2007–2015, dated 1998 no month.

Database WPI, Section Ch, Week 199523, Derwent Publications Ltd., London, GB; Class AN 1995–175241, XP002147982 & JP 07 097221 A (Tanaka Kikinzoku Kogyo KK), Apr. 11, 1995.*

Database WPI, Section Ch, Derwent Publications Ltd., London, GB; AN 1973–19113U, XP002147983 & SU 262 888 A (NS Kurnakov General And I).*

Patent Abstracts of Japan, vol. 012, No. 270 (C–515), Jul. 27, 1988 & JP 63 049253 A (Fuji Electric Co Ltd), Mar. 2, 1988.*

Patent Abstracts of Japan, vol. 005, No. 041 (C–047), Mar. 18, 1981 & JP 55 164042 A (Agency of Ind Science & Technol), Dec. 20, 1980.*

* cited by examiner

*Primary Examiner*—Roy King
*Assistant Examiner*—Tima McGuthry-Banks
(74) *Attorney, Agent, or Firm*—Norris McLaughlin & Marcus

(57) ABSTRACT

A method is described for the preparation of platinum wherein first an aqueous solution of a hexahalogenoplatinate is passed through a cation exchanger and then the solution obtained, at a temperature T>+30° C. and a pH of 0 to 4, is reduced by a reducing agent to precipitate in the form of a platinum sponge.

7 Claims, No Drawings

METHOD FOR PRODUCING PLATINUM

The invention relates to a method for the production of platinum.

It has long been known to produce platinum by reducing an aqueous solution of a hexachloroplatinate. A disadvantage of this method is the fact that the platinum sludge obtained has to be washed free of potassium ions by a number of washing operations, which for one thing manifests itself undesirably in the high consumption of the wash water and for another thing in the quality of the sponge which is degraded thereby.

From what has been stated, the problem is to eliminate the above disadvantages at least partially by means of a novel process. The problem lies especially in reducing the high water consumption to a minimum and thus at the same time improving the quality of the platinum sponge.

This problem is solved by the method of the invention according to claim 1.

The core of the present invention is the fact that, before the actual reduction, an aqueous hexahalogenoplatinate solution is added through a cation exchanger, the cations present—potassium ions for example—are exchanged with $H^+$. Furthermore, small amounts of impurities that might possibly be present are removed by the ion exchange process and the subsequent reduction to metallic platinum. In this manner a pure aqueous hexahalogenoplatinic acid solution free of metal ions is obtained, and then is reduced by a reducing agent at a temperature of T>+30° C. and a pH of 0 to 4, to precipitation, so that the resultant platinum sponge as such does not have to be washed free of metal ions.

It is advantageous, furthermore, if the platinum sponge product is washed, dried and heated to incandescence, since in this manner the last impurities are removed.

It is also advantageous if the solution after running through the cation exchanger is concentrated by evaporation, since the platinum obtained is more compact, can be better filtered and less wash water is used per kilogram of platinum sponge product.

Lastly, it proves to be advantageous to use hydrazine, ascorbic acid, formic acid or oxalic acid as reducing agents, since these substances have proven good in practice. However, other reducing agents are conceivable, such as hydrogen (under pressure), sugar, and formaldehyde, for example.

Advantageously, a solution of potassium hexahalogenoplatinate solution is used as the hexahalogenoplatinate solution, since this platinate can easily be isolated in preceding process steps.

Furthermore, a hexachloroplatinate solution is advantageous, since known separating processes are often produced in a hydrochloric acid medium and the hexachloroplatinate is the stable species in this medium.

Lastly, the reduction to platinum is advantageously performed at a temperature of +65° C. to +95° C. in order to obtain a finely divided platinum powder and prevent mirror coating or massive separation of platinum.

The following examples serve to explain the invention.

a) Preparation of the $H_2PtCl_6$

Apparatus Employed

The apparatus consisted of a 5-liter glass beaker, a stirrer motor, a glass stirrer, stick thermometer, PVDF shielding, gas burner, tripod and Ceran plate for dissolving the $K_2PtCl_6$; peristaltic pump with suction tube of glass, hose material, double-jacketed ion exchange column with PTFE plunger (filled with 247 cm³ of exchanger), drain hose with glass tube, 5-liter glass beaker for raffinate, a watch crystal and a thermostat for heating the exchanger column.

Procedure

An amount of 74.74 g $K_2PtCl_6$ (corresponds to about 30 g Pt) was dissolved in 3.5 liters of fully desalted water with stirring and heating at 75° C. in the 5-liter glass beaker (pH=2.44 at 71° C.). Then the clear solution was passed through the ion exchanger with the peristaltic pump for 2 hours at this temperature. Then the exchanger was rinsed out with 400 ml of fully desalted water. About 3.7 liters of $H_2PtCl_6$ solution including wash water was obtained.

Technical Data of Ion Exchange Column

| | |
|---|---|
| Inside diameter, column | 3.0 cm |
| Depth, exchange bed | 35 cm |
| Surface area, exchanger | 7.07 cm² |
| Rate of flow | 5 ml/cm²/min |
| Throughput | 2 l/h |
| Column temperature (thermostat) | +75° C. | b) Reduction with hydrazine hydrate (Lewoxin 15)

Apparatus Employed

The apparatus consisted of a 5-liter glass beaker, stirrer motor, glass stirrer, stick thermometer, PVDF covering, gas burner, tripod, Ceran plate and pH and redox single-bar measuring chain (Pt//Ag/AgCl).

Performance

The 3.7 liters of $H_2PtCl_6$ solution (pH=1,18 m/t=+21° C., approx. 30.0 g Pt abs. corresponding to 153.8 mmol) was placed in the glass beaker and heated within 45 minutes to 75° C. Then 50 ml of Lewoxin (234 mmol) was added in portions over a period of 10 minutes. The temperature then rose after such addition to 77° C. and the reaction was ended. During the addition of the Lewoxin the reaction mixture foamed vigorously each time. The initially yellow solution faded toward colorless and became clear while the reduced platinum was settling to the bottom of the beaker. The redox potential after the Lewoxin was added fell from an initial value of 686 mv vs Pt//Ag/AgCl to −58 mV vs. Pt//Ag/AgCl. The pH changed from the starting level of pH 1.19 to an end level of pH=0.85.

Thereafter the excess Lewoxin was boiled for a period of 2 hours, while the platinum sponge compacted and gathered on the bottom of the beaker.

The cooled suspension was suction filtered through a blue band filter, washed thrice in portions each with 500 ml of fully desalted water and the platinum powder was dried in the drying oven at 130° C. 30.163 g of gray platinum powder was obtained. No mirror coating occurred and massive platinum separations were observed to only a slight extent at the rough places in the apparatus. The mother liquor (3.6 liters) was analyzed by spectroscopy. The platinum concentration in the mother liquor amounted after reduction to 2 mg/l according to the DCP analysis, so that in the 3.6 liter volume the result is an absolute extraction of 7.2 mg corresponding to <0.024% of the initial amount.

In the purity analysis of the platinum powder product the impurities detected by x-ray fluorescence (GDL) were all below the detection limit of the analysis method.

Also, the following were analyzed: Na (<5 ppm with respect to platinum), K (5 ppm with respect to platinum) and Cl⁻ (2100 ppm with respect to platinum). Since the chloride is a hydrochloric acid impurity it is reduced to further below the specification limit by heating to incandescence or fusion.

What is claimed is:

1. A method for the production of platinum, which comprises passing an aqueous hexahalogenoplatinate solution through a cation exchanger and then reducing the solution obtained, at a temperature T>+30° C. and a pH of 0 to 4, reducing by means of a reducing agent to precipitate platinum in the form of a platinum sponge.

2. Method according to claim 1, wherein the platinum sponge obtained is washed, dried and heated to incandescence.

3. Method according to claim 1, wherein the solution, after passing through the cation exchanger, is concentrated by evaporation.

4. Method according to claim 1, wherein hydrazine, ascorbic acid, formic acid or oxalic acid is used as reducing agent.

5. Method according to claim 1, wherein a potassium hexahalogenoplatinate solution is used as the hexahalogenoplatinate solution.

6. Method according to claim 1, wherein a hexachloroplatinate solution is used as the hexahalogenoplatinate solution.

7. Method according to claim 1, wherein the reduction to platinum is performed at a temperature of +65° C. to +95° C.

* * * * *